United States Patent
Frydman et al.

(10) Patent No.: US 10,439,785 B2
(45) Date of Patent: Oct. 8, 2019

(54) DISTANCE MEASUREMENT ADJUSTMENT AT A MOBILE DEVICE

(71) Applicant: QUALCOMM Incorporated, San Diego, CA (US)

(72) Inventors: Javier Frydman, Tel-Mond (IL); Bernal Arroyo, San Jose, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 15/619,243

(22) Filed: Jun. 9, 2017

(65) Prior Publication Data
US 2018/0359165 A1    Dec. 13, 2018

(51) Int. Cl.
*H04L 5/00* (2006.01)
*H04W 56/00* (2009.01)
*H04W 92/10* (2009.01)
*H04B 7/26* (2006.01)

(52) U.S. Cl.
CPC ......... *H04L 5/0055* (2013.01); *H04W 56/001* (2013.01); *H04B 7/26* (2013.01); *H04W 92/10* (2013.01)

(58) Field of Classification Search
None
See application file for complete search history.

(56) References Cited

U.S. PATENT DOCUMENTS

| | | | |
|---|---|---|---|
| 2013/0059592 A1* | 3/2013 | Chakraborty | H04W 56/0015 455/444 |
| 2016/0150499 A1* | 5/2016 | Aldana | H04L 5/0055 455/456.2 |
| 2016/0302165 A1* | 10/2016 | Da | H04W 56/002 |

OTHER PUBLICATIONS

Wang et al, Security Enhancement to FTM, IEEE (Year: 2016).*
Zhu et al, Proposed 802.11az Functional Requirements, IEEE (Year: 2016).*
Segev et al, Next Generation Positioning Beyond Indoor Navigation, IEEE (Year: 2014).*

* cited by examiner

*Primary Examiner* — Yaotang Wang
(74) *Attorney, Agent, or Firm* — Steven R. Thiel; Toler Law Group PC.

(57) ABSTRACT

In a particular aspect, an apparatus includes first communication circuitry configured to perform first fine timing measurement (FTM) operations with respect to a device to generate first measurement data. The first FTM operation correspond to a first frequency band. The apparatus includes second communication circuitry configured to perform second FTM operations with respect to the device to generate second measurement data. The second FTM operations correspond to a second frequency band that is different than the first frequency band. The apparatus also includes a processor configured to compare the first measurement data and the second measurement data.

27 Claims, 7 Drawing Sheets

DISTANCE MEASUREMENT ADJUSTMENT AT A MOBILE DEVICE

I. FIELD

The present disclosure is generally related to adjusting distance measurements at a mobile device.

II. DESCRIPTION OF RELATED ART

Advances in technology have resulted in smaller and more powerful computing devices. For example, a variety of portable personal computing devices, including wireless telephones such as mobile and smart phones, tablets and laptop computers are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing and networking capabilities.

The computing capabilities of mobile devices may be used to execute one or more applications. Some applications offer location-based services. In order to support location-based services, a mobile device may determine a distance to another device associated with a known location. Mobile devices may perform measurement operations to determine distances between the mobile devices and other devices. The distances may be used to determine locations of the mobile devices. One particular measurement that can be performed by a mobile device and another device is a fine timing measurement (FTM) operation. The FTM operation may be defined in an industry standard, such as an Institute of Electrical and Electronics Engineers (IEEE) standard, as a non-limiting example. The FTM operation includes an exchange of a message and an acknowledgement between a requesting device (e.g., an initiator) and a responding device (e.g., a responder). Based on the generation and receive times of the message and the acknowledgement, a round trip time (RTT) is determined, and the RTT is used to calculate a distance between the initiator and the responder.

Accuracy of the FTM operation may be impacted by the components of the circuitry used to perform the FTM operation. For example, a transceiver of a mobile device may include filters, relays, amplifiers, and other analog components that can degrade the accuracy of the FTM operation due to biases associated with the components. To compensate for these biases, the components may be tuned by an engineer prior to sale or delivery of the mobile device. Because the tuning is performed by an engineer (e.g., by the engineer moving the mobile device to multiple different locations and performing multiple different measurements in order to estimate the biases), the tuning is time consuming and cost intensive. Additionally, the tuning does not compensate for biases or other factors that occur during the operational lifetime of the mobile device.

III. SUMMARY

In a particular aspect, an apparatus includes first communication circuitry configured to perform first fine timing measurement (FTM) operations with respect to a device to generate first measurement data. The first FTM operations correspond to a first frequency band. The apparatus includes second the communication circuitry configured to perform second FTM operations with respect to the device to generate second measurement data. The second FTM operations correspond to a second frequency band that is different than the first frequency band. In some implementations, the first communication circuitry and the second communication circuitry include at least one shared (e.g., reused) component. In other implementations, the first communication circuitry is distinct from the second communication circuitry. The apparatus also includes a processor configured to compare the first measurement data and the second measurement data. The processor may be further configured to determine an offset value based on the comparison, and the offset value may be used to "tune" (e.g., to modify or adjust) additional measurement data generated by the first communication circuitry, as further described herein.

In another particular aspect, a method of wireless communication includes performing, at first communication circuitry of a first device, first fine timing measurement (FTM) operations with respect to a second device to generate first measurement data. The first FTM operations correspond to a first frequency band. The method includes performing, at second communication circuitry of the first device, second FTM operations with respect to the second device to generate second measurement data. The second FTM operations correspond to a second frequency band that is different from the first frequency band. The method further includes comparing the first measurement data and the second measurement data.

In another particular aspect, an apparatus includes means for performing first fine timing measurement (FTM) operations with respect to a device to generate first measurement data. The first FTM operations correspond to a first frequency band. The apparatus includes means for performing second FTM operations with respect to the device to generate second measurement data. The second FTM operations correspond to a second frequency band that is different from the first frequency band. The apparatus further includes means for comparing the first measurement data and the second measurement data.

In another particular aspect, a non-transitory computer readable medium stores instructions that, when executed by the processor, cause the processor to perform operations including initiating, at first communication circuitry of a first device, performance of first fine timing measurement (FTM) operations with respect to a second device to generate first measurement data. The first FTM operations correspond to a first frequency band. The operations include initiating, at second communication circuitry of the first device, performance of second FTM operations with respect to the second device to generate second measurement data. The second FTM operations correspond to a second frequency band that is different from the first frequency band. The operations further include comparing the first measurement data and the second measurement data.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
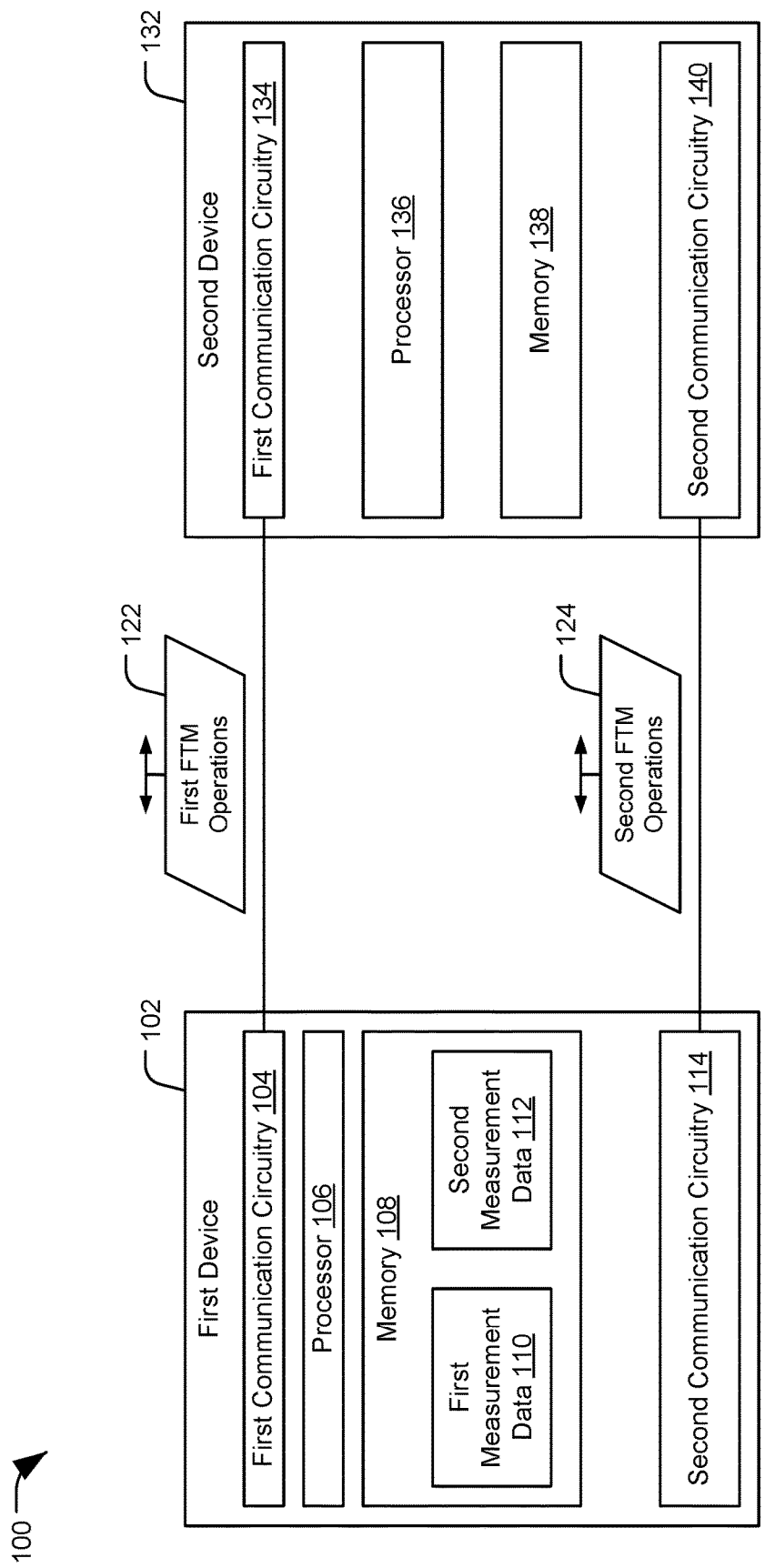
FIG. 1 is a block diagram of a first illustrative aspect of a system that adjusts measurement data based on a comparison of measurement data from multiple measurement operations.

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

The present disclosure describes systems and methods for adjusting or "tuning" (e.g., modifying) measurements performed using first communication circuitry based on measurements performed using second communication circuitry. For example, first measurements performed by the first communication circuitry and that correspond to a first frequency band may be less accurate than second measurements performed by the second communication circuitry and that correspond to a second frequency band. Results of the second measurements may be used to adjust additional measurements performed by the first communication circuitry. The measurements may be performed during the lifetime of a mobile device, such as periodically or at times when the mobile device is within range of a device, such as an access point (AP), that is capable of communicating via the first frequency band and the second frequency band, as further described herein. Adjusting measurements at a mobile device may reduce an amount of calibration performed prior to sale or delivery of the mobile device, which may reduce costs and time related to testing of the mobile device. For example, in some implementations, the first communication circuitry is not calibrated for distance measurements prior to sale or delivery of the mobile device. Additionally, because the measurements are adjusted throughout the operational lifetime of the mobile device, the adjustments may take into account biases or other errors that are associated with wear of components of the first communication circuitry.

To illustrate, a mobile device may include first communication circuitry configured to perform first fine timing measurement (FTM) operations with respect to a second device (e.g., an access point) to generate first measurement data and second communication circuitry configured to perform second FTM operations with respect to the second device to generate second measurement data. The first FTM operations correspond to a first frequency band (e.g., a 2.4 gigahertz (GHz) band, a 5 GHz band, or both) and the second FTM operations correspond to a second frequency band (e.g., a 60 GHz band). The FTM operations may be specified in a wireless communications standard, such as an Institute of Electrical and Electronics Engineers (IEEE) 802.11 standard, as a non-limiting example. In a particular implementation, the first communication circuitry is distinct from the second communication circuitry (e.g., the first communication circuitry and the second communication circuitry do not include a shared component). In another particular implementation, the first communication circuitry and the second communication circuitry may include at least one common component (e.g., performance of the second FTM operations may re-use at least one component that is used during performance of the first FTM operations).

The mobile device may detect the presence of the second device that is capable of performing wireless communications that correspond to the first frequency band and the second frequency band. For example, the mobile device may detect the presence of the second device based on an indication transmitted by the second device, as further described herein. The second device (e.g., the AP) may include circuitry configured to communicate via the first frequency band co-located with circuitry configured to communicate via the second frequency band. Because the second device is a single device (e.g., because the circuitry of the second device are co-located), the first measurement data and the second measurement data should be substantially the same (e.g., the first measurement data and the second measurement data should indicate the same distance between the mobile device and the second device). However, due to biases and other qualities related to the specific frequency band, the first measurement data may be less accurate than the second measurement data.

In order to determine data to use for adjusting distance measurements performed by the first communication circuitry, the mobile device initiates performance of the first FTM operations and the second FTM operations with respect to the second device. In a particular implementation, at least one of the first FTM operations may be performed concurrently with performance of at least one of the second FTM operations.

Concurrent performance of at least one of the first FTM operations and at least one of the second FTM operations improves the likelihood that the mobile device and the second device are at the same locations during performance of both sets of FTM operations. Alternatively, the first FTM operations and the second FTM operations may be performed serially. Because a person is not likely to travel a significant distance (and thereby move the mobile device a significant distance) during the time it takes to perform the FTM operations, the results of the serially performed FTM operations are likely to significantly match the results of the concurrently performed FTM operations. In a particular implementation, the first FTM operations and the second FTM operations are performed in response to a determination by the mobile device that channel conditions between the second communication circuitry and the second device satisfy a threshold (indicating that there is a substantially clear line of sight between the mobile device and the second device), as further described herein. The mobile device may generate first measurement data based on the first FTM operations and second measurement data based on the second FTM operations.

The mobile device may compare the first measurement data and the second measurement data to determine an offset, and the offset may be stored as tuning data at the mobile device. The offset (and additional tuning data, such as historical offsets, average offsets, median offsets, etc.) may be used to adjust measurement data that is generated based on additional FTM operations performed by the first communication circuitry. For example, the mobile device may perform third FTM operations with respect to a third device using the first communication circuitry (e.g., additional 2.4 GHz or 5 GHz operations) to generate third measurement data. The third measurement data may be adjusted based on the offset, and the adjusted third measurement data may be used by one or more applications of the mobile device (e.g., a social networking application) to support location-based services or other applications that use location information. Because the third measurement data (and additional measurement data generated based on FTM operations corresponding to the first frequency band) is adjusted based on the offset, the adjusted third measurement data is more accurate than measurement data generated by the first communication circuitry that is not adjusted. Additionally, the adjusted third measurement data is generated without performance of extensive calibration operations prior to sale or delivery of the mobile device, which reduces costs associated with the producing the mobile device.

Referring to FIG. 1, a particular illustrative aspect of a system that adjusts measurement data based on a comparison of measurement data from multiple measurement operations is shown and generally designated 100. The system 100 includes a first device 102 and a second device 132. The first device 102 may include a mobile device, such as a mobile telephone, a laptop computer, a tablet computer, personal fitness equipment, a media playback device, a vehicle (or a component thereof), other devices, or a combination thereof. In a particular implementation, the second device 132 includes an access point (AP). In another particular implementation, the second device 132 includes a fixed device. Alternatively, the second device 132 may include a mobile device, such as a mobile telephone, a laptop computer, a tablet computer, personal fitness equipment, a media playback device, a vehicle (or a component thereof), other devices, or a combination thereof.

The first device 102 includes first communication circuitry 104, a processor 106, a memory 108, and second communication circuitry 114. The processor 106 is coupled to the memory 108 and configured to process instructions stored at the memory 108 to perform the operations described herein. The memory 108 may be configured to store measurement data, tuning data, and other data, as further described herein. The second device 132 includes first communication circuitry 134, a processor 136, a memory 138, and second communication circuitry 140. The processor 136 is coupled to the memory 138 and configured to process instructions stored at the memory 138 to perform the operations described herein.

In a particular implementation, the operations described herein are performed by the processor 106 and the processor 136. In other implementations, one or more of the operations described herein may be performed by dedicated circuitry or hardware, such as a comparator, calibration circuitry, channel measurement circuitry, or other circuitry that may include a field programmable gate array (FPGA), an application-specific integrated circuit (ASIC), or other hardware that is configured to perform the operations described herein.

The first communication circuitry 104, the second communication circuitry 114, the first communication circuitry 134, and the second communication circuitry 140 may include or correspond to distinct integrated circuits or other communication circuitry. For example, the first communication circuitry 104, the second communication circuitry 114, the first communication circuitry 134, and second communication circuitry 140 may include separate transmitter(s), receiver(s), transceiver(s), transmit paths, receive paths, amplifiers, filters, relays, switches, matching circuits, other communication circuitry, or a combination thereof. Each of the first communication circuitry 104, the second communication circuitry 114, the first communication circuitry 134, and second communication circuitry 140 may be coupled to or have access to a corresponding antenna, and each of the first communication circuitry 104, the second communication circuitry 114, the first communication circuitry 134, and second communication circuitry 140 may be configured to perform wireless communications via the corresponding antenna. In other implementations, the first communication circuitry 104, the second communication circuitry 114, the first communication circuitry 134, and the second communication circuitry 140 share one or more components (e.g., a receiver, a transmitter, a transceiver, an antenna, etc.). To illustrate, the first communication circuitry 104 and the second communication circuitry 114 may include at least one shared component (e.g., a receiver, a transmitter, a transceiver, an antenna, etc.). Additionally, the first communication circuitry 134 and the second communication circuitry 140 may include at least one shared component. Alternatively, the first communication circuitry 104 may be distinct from the second communication circuitry 114. Additionally, the first communication circuitry 134 may be distinct from the second communication circuitry 140. In other implementations, the first communication circuitry 104 and the second communication circuitry 114 are the same communication circuitry (e.g., a single set of components, such as a single transceiver), and the first communication circuitry 134 and the second communication circuitry 140 are the same communication circuitry (e.g., a single set of components, such as a single transceiver).

Each of the first communication circuitry 104, the second communication circuitry 114, the first communication circuitry 134, and second communication circuitry 140 may be configured to perform wireless communications in accordance with one or more wireless communication protocols. For example, the first communication circuitry 104, the second communication circuitry 114, the first communication circuitry 134, and second communication circuitry 140 may be configured to perform wireless communications in accordance with an IEEE 802.11 protocol or a Wi-Fi Alliance protocol, as non-limiting examples. Additionally, the first communication circuitry 104, the second communication circuitry 114, the first communication circuitry 134, and second communication circuitry 140 may be configured to perform wireless communications that correspond to one or more frequency bands.

In a particular implementation, the first communication circuitry 104 and the first communication circuitry 134 are configured to perform wireless communications that correspond to a first frequency band, and the second communication circuitry 114 and the second communication circuitry 140 are configured to perform wireless communications that correspond to a second frequency band. In a particular implementation, the first frequency band includes or corresponds to a 2.4 gigahertz (GHz) band, a 5 GHz band, or both, and the second frequency band includes or corresponds to a 60 GHz band. In other implementations, the first frequency band and the second frequency band include or correspond to other frequency bands.

In a particular implementation, measurements performed by the first communication circuitry 104 are less accurate than measurements performed by the second communication circuitry 114 when channel measurements satisfy a threshold (e.g., when there is a substantially clear line of sight from the first device 102 to the second device 132), as further described herein. Such measurements may be less accurate because the first communication circuitry 104 (or components thereof, such as filters, relays, amplifiers, etc.) are calibrated for multiple different applications or platforms. For example, wireless communications corresponding to the first frequency band may be used by a variety of common applications, such as wireless local area network (WLAN) applications. Calibrating the first communication circuitry 104 for multiple platforms or applications is associated with time and resource costs to the manufacturer or vendor of the first device 102. In order to reduce calibration time prior to delivery or sale of the first device 102, calibration of the first communication circuitry 104 for performing distance measurements (e.g., the measurements described further herein) may be omitted, or minimal calibration may be performed. To account for biases not corrected by calibration, measurements can be adjusted, as further described herein, by the mobile device during operation. Unlike the first communication circuitry 104, the second communication circuitry 114 may be calibrated one time using characterization data that is applicable to all platforms or applications associated with the second communication circuitry 114. This one-time calibration also calibrates the second communication circuitry 114 for performing distance measurements. This one-time calibration may be sufficient due to characteristics of the second frequency band. For example, communications in the 60 GHz band have approximately 5 millimeter wavelengths that impose a high sampling spatial resolution.

However, the accuracy of the measurements associated with the second communication circuitry 114 may be degraded in certain conditions. For example, in situations in which channel measurements fail to satisfy the threshold (e.g., when there is not a substantially clear line of sight from the first device 102 to the second device 132), the accuracy of the measurements associated with the second communication circuitry 114 are degraded. In such situations, the first communication circuitry 104 may be used to perform the FTM operations. Because the second communication circuitry 114 may be used one or more times to adjust or tune measurements determined using the first communication circuitry 104, the first device 102 may generate adjusted measurement data having higher accuracy than if the measurement data was not adjusted in situations in which the channel measurements fail to satisfy the threshold (or in other situations when the second communication circuitry 114 is unavailable).

During operation, the first device 102 may receive an indication from the second device 132 that the second device 132 is capable of performing communications corresponding to the first frequency band and the second frequency band. For example, the second device 132 may be an AP that includes both the first communication circuitry 134 and the second communication circuitry 140 (e.g., circuitry associated with the first frequency band may be co-located with circuitry associated with the second frequency band). Details of the indication are described further herein with reference to FIGS. 4 and 5.

Based on receiving the indication, the first device 102 may determine to perform one or more measurement operations with respect to the second device 132. For example, the first communication circuitry 104 may be configured to perform one or more first fine timing measurement (FTM) operations 122 with respect to the second device 132 to generate first measurement data 110. Performing the first FTM operations 122 includes sending and receiving messages between the first communication circuitry 104 of the first device 102 and the first communication circuitry 134 of the second device 132. The communications correspond to the first frequency band. For example, performing the first FTM operations may include sending (or receiving) a FTM message, sending (or receiving an acknowledgement), and sending (or receiving) additional information, as further described with reference to FIG. 2. In a particular implementation, the FTM operations are standardized, such as in an IEEE 802.11 standard or a Wi-Fi Alliance standard.

The first device 102 may also perform additional FTM operations with respect to the second device 132. For example, the second communication circuitry 114 may be configured to perform one or more second FTM operations 124 with respect to the second device 132 to generate second measurement data 112. Performing the second FTM operations 124 includes sending and receiving messages between the second communication circuitry 114 of the first device 102 and the second communication circuitry 140 of the second device 132. The communications correspond to the second frequency band. In a particular implementation, a first accuracy corresponding to the first measurement data 110 is less than a second accuracy corresponding to the second measurement data 112.

In a particular implementation, at least one of the first FTM operations 122 and at least one of the second FTM operations 124 are performed concurrently. For example, the first communication circuitry 104 may be further configured to perform at least one of the first FTM operations 122 concurrently with performance of at least one of the second FTM operations 124. As used herein, operations are performed concurrently if at least a portion of performance of a first operation overlaps in time with at least a portion of performance of a second operation. In some implementations, concurrent performance includes simultaneous performance. Because the first FTM operations 122 and the second FTM operations 124 are performed concurrently, and because the first communication circuitry 134 is co-located with the second communication circuitry 140 (e.g., both the first communication circuitry 134 and the second communication circuitry 140 are included in a single device), the first measurement data 110 and the second measurement data 112 should indicate substantially the same value. In other implementations, the first FTM operations 122 and the second FTM operations 124 are performed serially. In situations in which a mobile device is carried by a person, the mobile device is unlikely to move a significant distance during serial performance of the first FTM operations 122 and the second FTM operations 124, and thus the first measurement data 110 and the second measurement data 112 should indicate substantially the same value. However, due to biases and other factors associated with the first communication circuitry 104, the first measurement data 110 and the second measurement data 112 indicate different values.

The first device 102 may compare the measurement data to determine an offset value to be used to adjust (e.g., modify) subsequent measurement data that is generated based on additional FTM operations performed by the first communication circuitry 104. For example, the processor 106 may compare the first measurement data 110 to the second measurement data 112. An offset value (e.g., a difference) between the first measurement data 110 and the second measurement data 112 may be determined based on the comparison. The offset value may be stored as tuning data at the memory 108, and the processor 106 (or calibration circuitry) may adjust additional measurement data based on the offset value, as further described with reference to FIG. 3.

By comparing the first measurement data 110 to the second measurement data 112 to determine an offset value, the first device 102 is able to determine a tuning value (e.g., the offset value or a value based on the offset value) to adjust additional measurement data generated by the first communication circuitry 104. Adjusting the additional measurement data improves accuracy of the additional measurement data. Thus, in situations in which channel measurements fail to exceed a threshold (e.g., when there is not a clear line of sight between the first device 102 and a device with which the first device 102 is performing a FTM operation (or other situations when the second communication circuitry 114 is unavailable or not used), the first device 102 may generate measurement data having higher accuracy as compared to other mobile devices.

Figure 2:
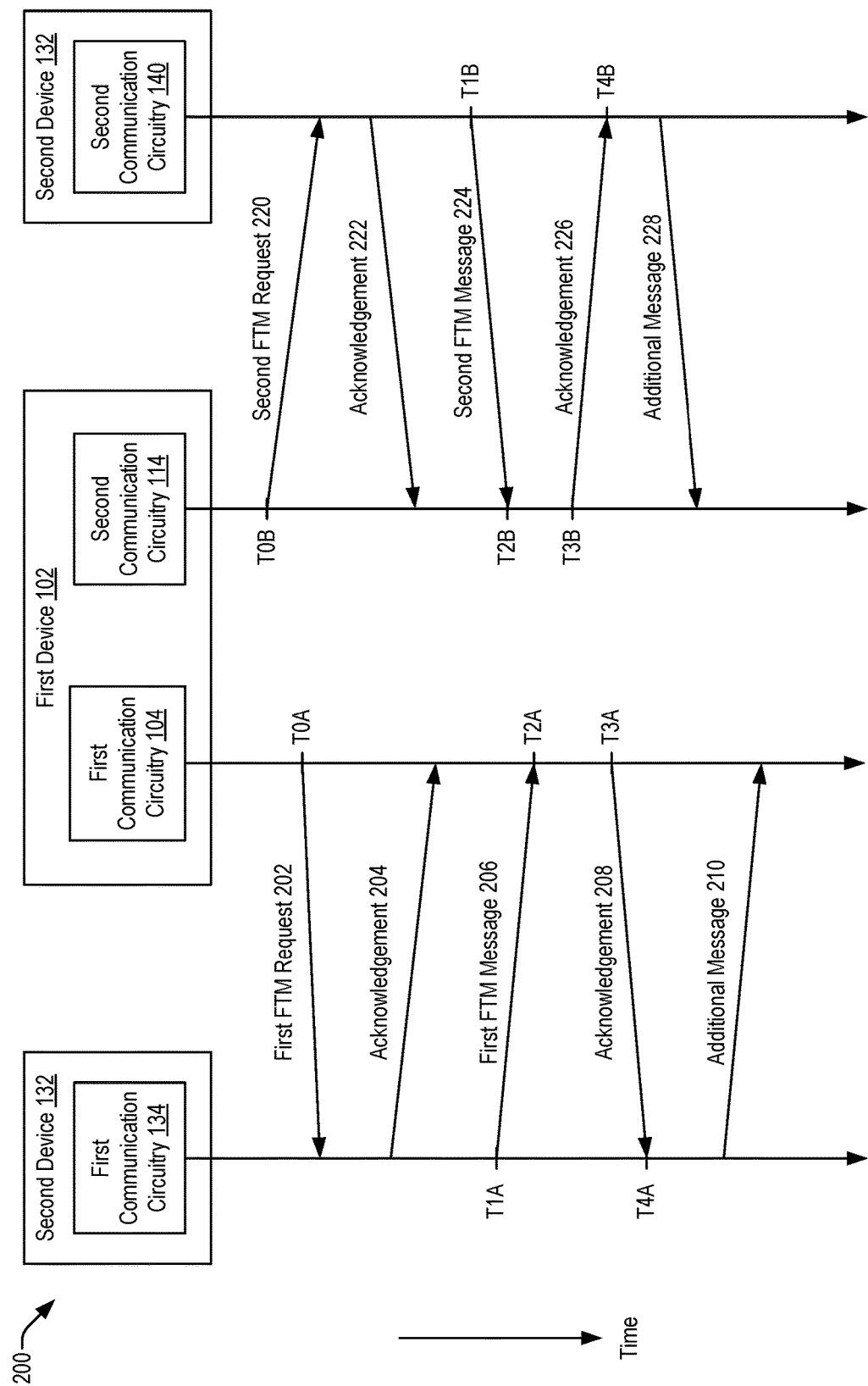
FIG. 2 is a ladder diagram illustrating an example of timing of message transmissions by the devices of FIG. 1.

Referring to FIG. 2, a ladder diagram illustrating an example of timing of message transmissions by the devices of FIG. 1 is shown and generally designated 200. FIG. 2 illustrates a first set of wireless communications between the first communication circuitry 104 of the first device 102 and the first communication circuitry 134 of the second device 132 and a second set of wireless communications between the second communication circuitry 114 of the first device 102 and the second communication circuitry 140 of the second device 132. In a particular implementation, the second device 132 includes or corresponds to an AP having co-located circuitry configured to perform wireless communications corresponding to multiple frequency bands.

The first set of wireless communications corresponds to performance of first FTM operations between the first device 102 and the second device 132, and the second set of wireless communications corresponds to performance of second FTM operations between the first device 102 and the second device 132. The first FTM operations and the second FTM operations include or correspond to wireless communications that correspond to different frequency bands. As a particular example, the first FTM operations may correspond to a 2.4 GHz frequency band, a 5 GHz frequency band, or both (e.g., a frequency band corresponding to WLAN communications), and the second FTM operations may correspond to a 60 GHz frequency band. To illustrate, the first communication circuitry 104 and the first communication circuitry 134 may be configured to perform wireless communications corresponding to the 2.4 GHz frequency band, the 5 GHz frequency band, or both, and the second communication circuitry 114 and the second communication circuitry 140 may be configured to perform wireless communications corresponding to the 60 GHz frequency band.

The first FTM operations include a first FTM request 202. For example, in response to determining, at the first device 102, that the second device 132 is capable of performing wireless communications corresponding to the first frequency band and the second frequency band, the first device 102 may send the first FTM request 202, at time T0A, from the first communication circuitry 104 to the first communication circuitry 134 of the second device 132. In response to receiving the first FTM request 202, the second device 132 may determine to perform the first FTM operations and may send an acknowledgement 204 from the first communication circuitry 134 to the first communication circuitry 104 of the first device 102. The acknowledgement 204 indicates that the second device 132 will perform the requested first FTM operation with the first device 102.

After sending the acknowledgement 204, the second device 132 sends a first FTM message 206, at time T1A, from the first communication circuitry 134 to the first communication circuitry 104. The first device 102 receives the first FTM message 206 at time T2A. In response to receiving the first FTM message 206, the first device 102 sends an acknowledgement 208, at time T3A, from the first communication circuitry 104 to the first communication circuitry 134. In a particular implementation, the acknowledgement 208 includes an indication of T2A and T3A for use by the second device 132 in determining a distance from the second device 132 to the first device 102. The second device 132 receives the acknowledgement 208 at time T4A. After receiving the acknowledgement 208, the second device 132 may transmit an additional message 210 to the first device 102. The additional message 210 may indicate T1A and T4A for use by the first device 102 in determining the distance from the first device 102 to the second device 132.

To illustrate, the first device 102 may determine the distance from the first device 102 to the second device 132 based on T1A, T2A, T3A, and T4A. For example, the distance may be equal to the return time (RTT)/2c, where c is the speed of light, and RTT=(T4A−T3A)+(T2A−T1A). However, because of biases in the first communication circuitry 104, the distance determined by the first device 102 may have a lower accuracy than the same distance determined using other measurements. For this reason, the first device 102 also performs the second FTM operations.

The second FTM operations include a second FTM request 220. For example, in response to determining, at the first device 102, that the second device 132 is capable of performing wireless communications corresponding to the first frequency band and the second frequency band, the first device 102 may also send the second FTM request 220, at time T0B, from the second communication circuitry 114 to the second communication circuitry 140 of the second device 132. In response to receiving the second FTM request 220, the second device 132 may determine to perform the second FTM operations and may send an acknowledgement 222 from the second communication circuitry 140 to the second communication circuitry 114 of the first device 102. The acknowledgement 222 indicates that the second device 132 will perform the requested second FTM operation with the first device 102.

After sending the acknowledgement 222, the second device 132 sends a second FTM message 224, at time T1B, from the second communication circuitry 140 to the second communication circuitry 114. The first device 102 receives the second FTM message 224 at time T2B. In response to receiving the second FTM message 224, the first device 102 sends an acknowledgement 226, at time T3B, from the second communication circuitry 114 to the second communication circuitry 140. In a particular implementation, the acknowledgement 226 includes an indication of T2B and T3B for use by the second device 132 in determining a distance from the second device 132 to the first device 102. The second device 132 receives the acknowledgement 226 at time T4B. After receiving the acknowledgement 226, the second device 132 may transmit an additional message 228 to the first device 102. The additional message 228 may indicate T1B and T4B for use by the first device 102 in determining the distance from the first device 102 to the second device 132.

The first device 102 may similarly determine the distance to the second device 132 based on T1B, T2B, T3B, and T4B. However, the distance determined based on T1B, T2B, T3B, and T4B may be more accurate than the distance determined based on T1A, T2A, T3A, and T4A. Thus, the distance determined based on T1B, T2B, T3B, and T4B (e.g., a second distance) may be compared to the distance based on T1A, T2A, T3A, and T4A (e.g., a first distance) to determine an offset. The offset may be used to modify or tune additional distance measurements determined based on FTM operations performed using the first communication circuitry 104, as further described with reference to FIG. 3.

The first FTM operations and the second FTM operations may be performed concurrently. For example, at least a portion of the first FTM operations (e.g. exchange of at least one message between the first device 102 and the second device 132 corresponding to the first frequency band) may be performed during performance of at least a portion of the second FTM operations (e.g., exchange of at least one message between the first device 102 and the second device 132 corresponding to the second frequency band). In the example illustrated in FIG. 2, at least one message corresponding to the first frequency band is exchanged between a start (e.g., time T0B) and completion (e.g., receipt of the additional message 228) of the second FTM operations. In other implementations, the first FTM operations and the second FTM operations have the same start times and end times (e.g., the FTM operations may be performed simultaneously). In other implementations, the first FTM operations start after the start of the second FTM operations and the first FTM operations are complete prior to completion of the second FTM operations. In other implementations, the second FTM operations start after the start of the first FTM operations and the second FTM operations are complete prior to completion of the first FTM operations. By performing the first FTM operations and the second FTM operations concurrently, the distance between the first device 102 and the second device 132 should not vary substantially during performance of both FTM operations. Accordingly, distances determined based on the FTM operations should be substantially the same (with variations due to biases associated with the first frequency band and the second frequency band). In other implementations, the FTM operations are performed serially. In situations in which the first device 102 is carried by a person, the first device 102 is unlikely to move a significant distance during serial performance of the FTM operations, and thus distances determined based on the serially performed FTM operations should be substantially the same (with variations due to biases associated with the first frequency band and the second frequency band).

The distance determined based on the FTM operations may be used to support location based services at the first device 102. For example, the first device 102 may not include global positioning system (GPS) or other location determining circuitry, or the first device 102 may leave such circuitry in a low-power state. However, the second device 132 may have location determining circuitry (or may otherwise be associated with a known location). Thus, the first device 102 may be able to determine its location based on a distance (and a direction) to the second device 132. To determine the distance, the first device 102 may perform the FTM operations with respect to the second device 132. In this manner, the first device 102 may be able to determine its location without having location determining circuitry (or without using such circuitry, which may reduce power consumption as compared to using the first communication circuitry 104 and the second communication circuitry 114). In other implementations, the first device 102 uses the distance measurement for other applications.

Figure 3:
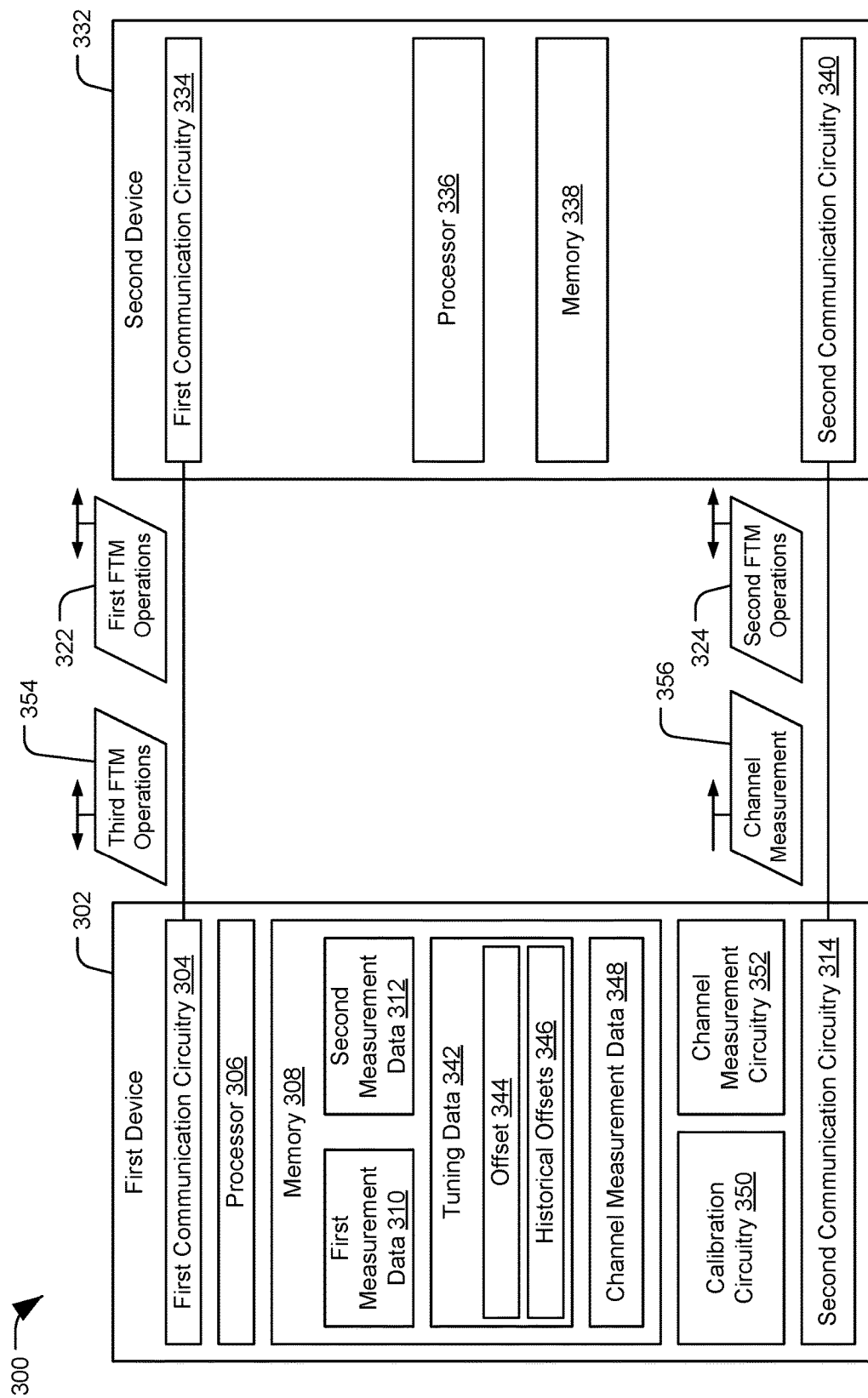
FIG. 3 is a block diagram of a second illustrative aspect of a system that includes a device that adjusts measurement data based on a comparison of measurement data from multiple measurement operations.

Referring to FIG. 3, a second illustrative aspect of a system that adjusts measurement data based on a comparison of measurement data from multiple measurement operations is shown and generally designated 300. The system 300 includes a first device 302 and a second device 332. The first device 302 may include first communication circuitry 304, a processor 306, a memory 308, and second communication circuitry 314, and the second device 332 may include first communication circuitry 334, a processor 336, a memory 338, and second communication circuitry 340. In a particular implementation, the first device 302 and the second device 332 include or correspond to the first device 102 and the second device 132 of FIG. 1. For example, the first communication circuitry 304, the processor 306, the memory 308, the second communication circuitry 314, the first communication circuitry 334, the processor 336, the memory 338, and the second communication circuitry 340 may include or correspond to the first communication circuitry 104, the processor 106, the memory 108, the second communication circuitry 114, the first communication circuitry 134, the processor 136, the memory 138, and the second communication circuitry 140 of FIG. 1, respectively.

In the implementation illustrated in FIG. 3, the first device 302 further includes calibration circuitry 350 and channel measurement circuitry 352. Each of the calibration circuitry 350 and the channel measurement circuitry 352 may include dedicated circuitry or hardware, a FPGA, an ASIC, or other hardware that is configured to perform the operations described herein. In other implementations, the first device 302 does not include the calibration circuitry 350, the channel measurement circuitry 352, or both, and the operations of the calibration circuitry 350, the channel measurement circuitry 352, or both, are performed by the processor 306. The calibration circuitry 350 may be configured to adjust measurement data generated based on operations performed by the first communication circuitry 304, as further described herein. The channel measurement circuitry 352 may be configured to perform one or more measurements associated with a communication channel between the second communication circuitry 314 and the second device 332 (e.g., the second communication circuitry 340) to generate channel measurement data 348, as further described herein. The channel measurement data 348 may be used to initiate performance of first FTM operations and second FTM operations, as further described herein.

During operation, the first device 302 may receive an indication from the second device 332 that the second device 332 is capable of performing communications corresponding to the first frequency band and the second frequency band. For example, the second device 332 may be an AP that includes both the first communication circuitry 334 and the second communication circuitry 340 (e.g., circuitry associated with the first frequency band may be co-located with circuitry associated with the second frequency band). Details of the indication are described further herein with reference to FIGS. 4 and 5.

In a particular implementation, the first device 302 initiates one or more channel measurements based on receiving the indication. For example, the channel measurement circuitry 352 may perform a channel measurement 356 on the communication channel between the second communication circuitry 314 and the second device 332 to generate the channel measurement data 348. The channel measurement data 348 may indicate a standard deviation of a measurement (e.g., a standard deviation of a distance measurement compared to other distance measurements from the same location), a received signal strength indicator (RSSI), a signal to noise ratio (SNR), an access delay, another measurement, or a combination thereof. In a particular implementation, the channel measurement data 348 indicates a channel profile associated with the communication channel between the second communication circuitry 314 and the second device 332.

First FTM operations 322 and second FTM operations 324 may be initiated based on the channel measurement data 348. For example, the processor 306 may be configured to initiate the first FTM operations 322 and the second FTM operations 324 based on the channel measurement data 348 satisfying a threshold. For example, a value of a measurement that indicates suitability of the communication channel for communications may be greater than (or equal to) a threshold (e.g., satisfying a threshold). Alternatively, a value of a measurement that indicates unsuitability of the communication channel for communications may be less than (or equal to) the threshold (e.g., satisfying the threshold). In a particular implementation, the channel measurement data 348 indicates the channel profile, and the existence of a single tap in the channel profile indicates that the threshold is satisfied. Satisfaction of the threshold may indicate that there is a substantially clear line of sight between the first device 302 and the second device 332. In some implementations, measurements performed by the second communication circuitry 314 are significantly degraded when there is not a substantially clear line of sight between the first device 302 and the second device 332 (e.g., if the channel measurement data 348 fails to satisfy the threshold).

Based on the channel measurement data 348 satisfying the threshold, the processor 306 initiates performance of the first FTM operations 322 and the second FTM operations 324. The first FTM operations 322 and the second FTM operations 324 may include or correspond to the first FTM operations 122 and the second FTM operations 124 of FIG. 1, respectively. Performing the first FTM operations 322 generates first measurement data 310, and performing the second FTM operations 324 generates second measurement data 312.

The first measurement data 310 and the second measurement data 312 may be compared to generate data used to adjust additional measurements. For example, the processor 306 may be configured to determine an offset 344 between the first measurement data 310 and the second measurement data 312 based on the comparison. The processor 306 may store the offset 344 as tuning data 342 at the memory 308.

The memory 308 may be configured to store the tuning data 342. The tuning data 342 may include the offset 344, an average offset, a median offset, historical offsets 346, other values, or a combination thereof. The historical offsets 346 include one or more offsets between measurements associated with the first communication circuitry 304 and measurements associated with the second communication circuitry 314 that are determined during the lifetime of the first device 302. The historical offsets 346 may be updated based on the offset 344. The tuning data 342 may also include an average (e.g., mean) of the historical offsets 346, a median of the historical offsets 346, a mode of the historical offsets 346, another value derived from the historical offsets 346, or a combination thereof.

The first device 302 may adjust additional measurements generated by the first communication circuitry 304 based on the tuning data 342 (e.g., based on the offset 344). For example, the processor 306 may be configured to initiate performance of third FTM operations 354 with respect to the second device 332 at a later time. The third FTM operations 354 correspond to the first frequency band (e.g., the 2.4 GHz band, the 5 GHz band, or both). Although illustrated as being performed with respect to the second device 332, in other implementations, the third FTM operations 354 are performed with respect to a third device that is different from the second device 332. The third device includes an AP or other device that is capable of performing FTM operations corresponding to the first frequency band.

To illustrate, at a second time after performance of the first FTM operations 322 and the second FTM operations 324, an application at the first device 302 may request location based services. To determine a current location of the first device 302, the first device 302 may perform the third FTM operations 354 with the second device 332 (or any other device associated with a known location). Performing the third FTM operations 354 may generate third measurement data. The first device 302 may adjust the third adjustment data based on the tuning data 342 to improve the accuracy of the third measurement data. For example, the calibration circuitry 350 may be configured to adjust (e.g., to calibrate) the third measurement data based on the offset 344. Alternatively, the calibration circuitry 350 may be configured to adjust the third measurement data based on a value that is based on the offset 344 and the historical offsets 346, such as an average value or a median value. In a particular implementation, adjusting the third measurement data may include subtracting (or adding) the offset 344 to the third measurement data. In another particular implementation, the processor 306 or the calibration circuitry 350 may determine a scaling factor based on the offset 344, and adjusting the third measurement data may include scaling the third measurement data based on the offset. After adjustment, the third measurement data may indicate a value that is substantially the same as a value that would be determined based on FTM operations performed by the second communication circuitry 314. However, the adjusted third measurement data may be determined using less power than if measurement operations were performed by the second communication circuitry 314.

As a particular example, the distance between the first device 302 and the second device 332 may be 24.5 meters (m). The first measurement data 310 may indicate a distance of 26.7 m, and the second measurement data 312 may indicate a distance of 24.501 m. In this example, the offset 344 is 26.7−24.501=2.199 m. When additional FTM operations are performed via communications corresponding to the first frequency band, the offset 344 (e.g., 2.199 m) may be subtracted from the determined measurement (e.g., distance) to generate an adjusted measurement. The adjusted measurement may be more accurate than if the offset 344 is not subtracted from the additional measurement. In another particular implementation, a scaling factor may be determined based on the offset 344. For example, the scaling factor may be 24.501/26.7=0.91764, and subsequent determined measurement may be scaled by the scale factor to generate the adjusted measurement. In a particular implementation, adjusting additional measurements based on the offset 344 (or the tuning data 342) improves the accuracy of the additional measurements by as much as 2.685 m. In other implementations, the accuracy is improved by a different amount.

In this manner, the first device 302 is able to determine more accurate measurements using the first communication circuitry 304 than other devices that includes similar circuitry. Additionally, the measurements can be generated without using the second communication circuitry 314 to perform each measurement. Because accuracy corresponding to measurements performed using the second communication circuitry 314 is degraded when channel measurements fail to satisfy the threshold (e.g., when there is not a clear line of sight between the first device 302 and another device), the first device 302 performs measurements with higher accuracy than other devices in situations when there is not a clear line of sight between the first device 302 and another device. Additionally, the tuning data 342 may be updated periodically. For example, when the first device 302 is within range of another AP that supports communications corresponding to the first frequency band and the second frequency band, the first device 302 can perform FTM operations using the first communication circuitry 304 and the second communication circuitry 314 to update the tuning data 342 (e.g., the offset 344). Updating the tuning data 342 during the lifetime of the first device 302 may enable the adjustments made based on the tuning data 342 to account for biases that occur after delivery and sale of the first device 302 that would otherwise not be accounted for by calibration prior to delivery or sale of the first device 302.

Figure 4:
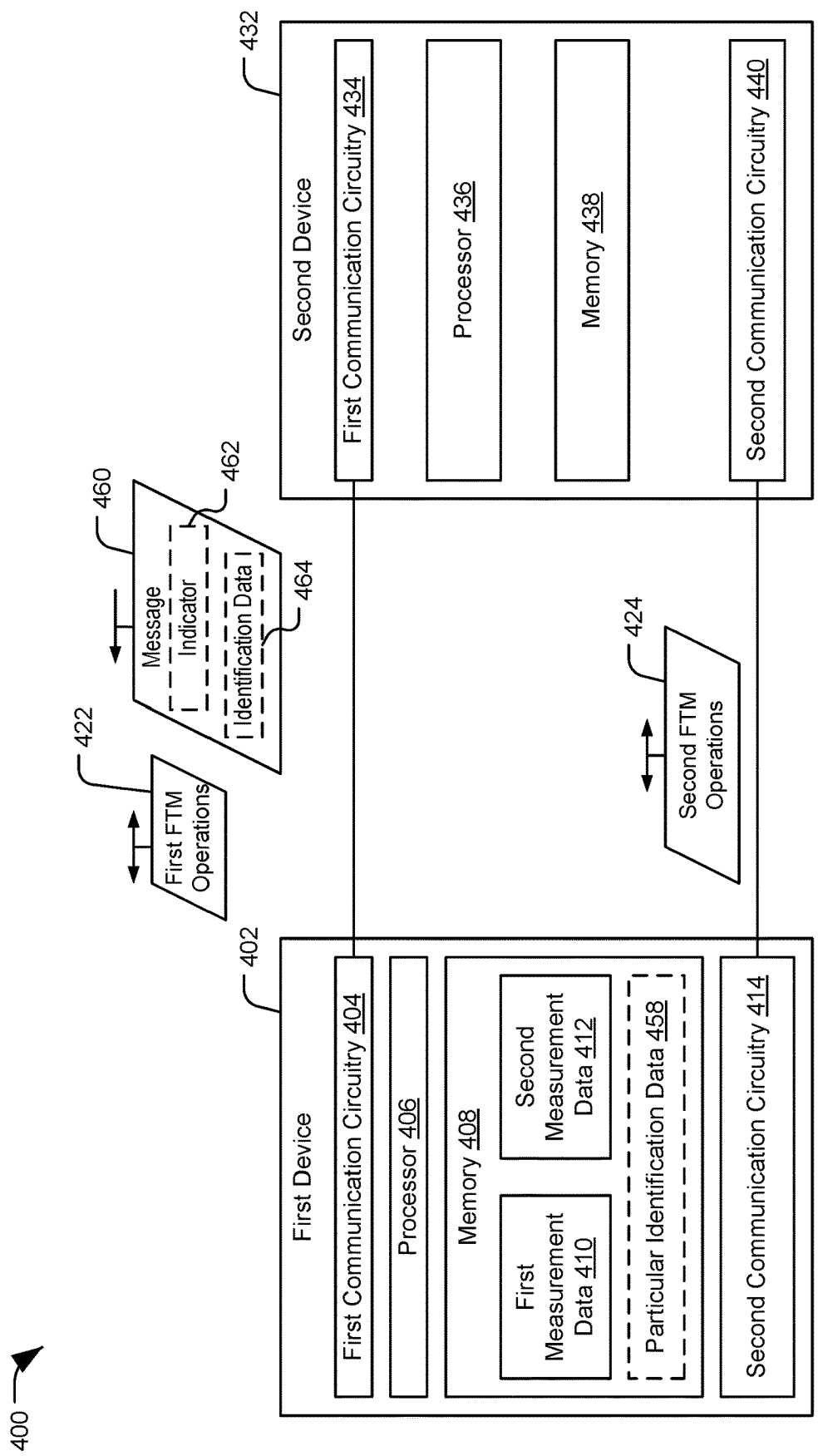
FIG. 4 is a block diagram of a third illustrative aspect of a system that includes a device that adjusts measurement data based on a comparison of measurement data from multiple measurement operations.

Referring to FIG. 4, a third illustrative aspect of a system that adjusts measurement data based on a comparison of measurement data from multiple measurement operations is shown and generally designated 400. The system 400 includes a first device 402 and a second device 432. The first device 402 may include first communication circuitry 404, a processor 406, a memory 408, and second communication circuitry 414, and the second device 432 may include first communication circuitry 434, a processor 436, a memory 438, and second communication circuitry 440. In a particular implementation, the first device 402 and the second device 432 include or correspond to the first device 102 and the second device 132 of FIG. 1. For example, the first communication circuitry 404, the processor 406, the memory 408, the second communication circuitry 414, the first communication circuitry 434, the processor 436, the memory 438, and the second communication circuitry 440 may include or correspond to the first communication circuitry 104, the processor 106, the memory 108, the second communication circuitry 114, the first communication circuitry 134, the processor 136, the memory 138, and the second communication circuitry 140 of FIG. 1, respectively.

During operation, the second device 432 may advertise communication capabilities of the second device 432 to other devices. For example, the second device 432 may send a message 460 to nearby devices, including the first device 402. In the particular implementation illustrated in FIG. 4, the message 460 is sent by the first communication circuitry 434 and corresponds to the first frequency band (e.g., the 2.4 GHz band, the 5 GHz band, or both). In other implementations, the message 460 is sent by the second communication circuitry 440 and corresponds to the second frequency band (e.g., the 60 GHz band).

The message 460 may include an indicator 462, identification data 464, or both. The indicator 462 may include an element, a field, a bit, or another portion of the message 460 that indicates that the second device 432 is available to communicate via the first frequency band and the second frequency band. In a particular implementation, the message 460 includes or corresponds to a beacon message. In another particular implementation, the indicator 462 is included in a multiband information element of the message 460. In some implementations, the message 460 also includes communication information that enables other devices to perform wireless communications with the second device 432, such as addresses of the first communication circuitry 434 and the second communication circuitry 440, schedules or other timing associated with the first communication circuitry 434 and the second communication circuitry 440, other information, or a combination thereof.

The identification data 464 may indicate an identity of the second device 432. The identification data 464 may indicate a unique identifier, such as a media access control (MAC) address or other device identifier, or an identifier that is common to a plurality of devices. In a particular implementation, the identification data 464 includes a vendor identifier.

In response to receiving the message 460, the first device 402 may determine whether to perform first FTM operations 422 and second FTM operations 424 to generate first measurement data 410 and second measurement data 412, respectively. The first FTM operations 422 and the second FTM operations 424 may include or correspond to the first FTM operations 122 and the second FTM operations 124 of FIG. 1, respectively. To illustrate, the processor 406 may inspect the indicator 462. Based on determining that the indicator 462 indicates that the second device 432 is capable of performing wireless communications corresponding to the first frequency band and the second frequency band, the processor 406 may initiate performance of the first FTM operations 422 and the second FTM operations 424. If the indicator 462 does not indicate that the second device 432 is capable of performing wireless communications corresponding to the first frequency band and the second frequency band, the processor 406 refrains from performing the first FTM operations 422 and the second FTM operations 424.

Additionally or alternatively, the first device 402 may determine whether to perform the first FTM operations 422 and the second FTM operations 424 based on the identification data 464. For example, the processor 406 may be configured to compare the identification data 464 to particular identification data 458 stored at the memory 408. The particular identification data 458 may be stored at the first device 402 during manufacturing or testing, or may be stored at the first device 402 via an update, such as a software of firmware update. The particular identification data 458 may indicate an identifier of devices that are known to be capable of performing wireless communications corresponding to the first frequency band and the second frequency band. As a particular example, the particular identification data 458 may indicate a vendor identifier. Based on the identification data 464 matching the particular identification data 458, the processor 406 may initiate performance of the first FTM operations 422 and the second FTM operations 424. If the identification data 464 does not match the particular identification data 458, the processor 406 refrains from performing the first FTM operations 422 and the second FTM operations 424.

Figure 5:
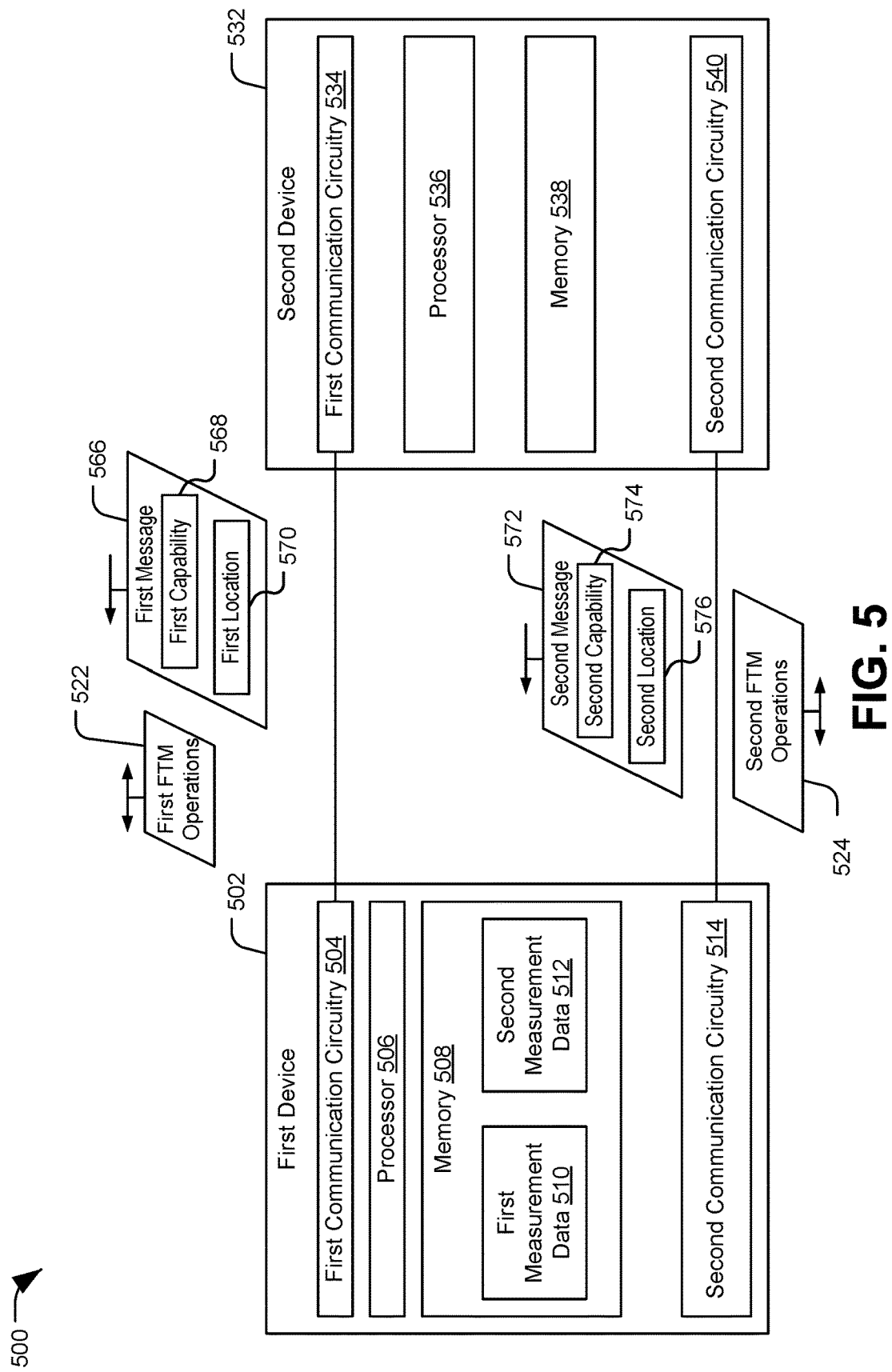
FIG. 5 is a block diagram of a fourth illustrative aspect of a system that includes a device that adjusts measurement data based on a comparison of measurement data from multiple measurement operations.

Referring to FIG. 5, a fourth illustrative aspect of a system that adjusts measurement data based on a comparison of measurement data from multiple measurement operations is shown and generally designated 500. The system 500 includes a first device 502 and a second device 532. The first device 502 may include first communication circuitry 504, a processor 506, a memory 508, and second communication circuitry 514, and the second device 532 may include first communication circuitry 534, a processor 536, a memory 538, and second communication circuitry 540. In a particular implementation, the first device 502 and the second device 532 include or correspond to the first device 102 and the second device 132 of FIG. 1. For example, the first communication circuitry 504, the processor 506, the memory 508, the second communication circuitry 514, the first communication circuitry 534, the processor 536, the memory 538, and the second communication circuitry 540 may include or correspond to the first communication circuitry 104, the processor 106, the memory 108, the second communication circuitry 114, the first communication circuitry 134, the processor 136, the memory 138, and the second communication circuitry 140 of FIG. 1, respectively.

During operation, the second device 532 may advertise communication capabilities of the second device 532 to other devices. For example, the second device 532 may send a first message 566 and a second message 572 to nearby devices, including the first device 502. In a particular implementation, the first message 566 is sent by the first communication circuitry 534 and corresponds to the first frequency band (e.g., the 2.4 GHz band, the 5 GHz band, or both), and the second message 572 is sent by the second communication circuitry 540 and corresponds to the second frequency band (e.g., the 60 GHz band).

The first message 566 may indicate a first capability 568 and a first location 570, and the second message 572 may indicate a second capability 574 and a second location 576. The first capability 568, the first location 570, the second capability 574, and the second location 576 may be indicated by an element, a field, a bit, or another portion of the respective message. The first capability 568 may indicate a capability of the first communication circuitry 534 to perform wireless communications corresponding to the first frequency band and the first location 570 may indicate a location of the first communication circuitry 534. The second capability 574 may indicate a capability of the second communication circuitry 540 to perform wireless communications corresponding to the second frequency band and the second location 576 may indicate a location of the second communication circuitry 540.

In response to receiving the first message 566 and the second message 572, the first device 502 may determine whether to perform first FTM operations 522 and second FTM operations 524 to generate first measurement data 510 and second measurement data 512, respectively. The first FTM operations 522 and the second FTM operations 524 may include or correspond to the first FTM operations 122 and the second FTM operations 124 of FIG. 1, respectively. To illustrate, the processor 506 may inspect the first capability 568 and the second capability 574. Based on determining that the first capability 568 corresponds to the first frequency band and that the second capability 574 corresponds to the second frequency band, the processor 506 may compare the first location 570 to the second location 576. Based on determining that the first location 570 matches the second location 576, the first device 502 may determine that circuitry capable of performing wireless communications corresponding to the first frequency band is co-located (e.g., at the same location, in this case in the same device) with circuitry capable of performing wireless communications corresponding to the second frequency band. Based on the first location 570 matching the second location 576, the processor 506 may initiate performance of the first FTM operations 522 and the second FTM operations 524. If the first location 570 does not match the second location 576, the processor 506 refrains from performing the first FTM operations 522 and the second FTM operations 524. For example, if the first device 502 receives messages from two different devices that each advertise communications capabilities corresponding to one of the two frequency bands, the first device 502 refrains from performing FTM operations with respect to the two devices.

Figure 6:
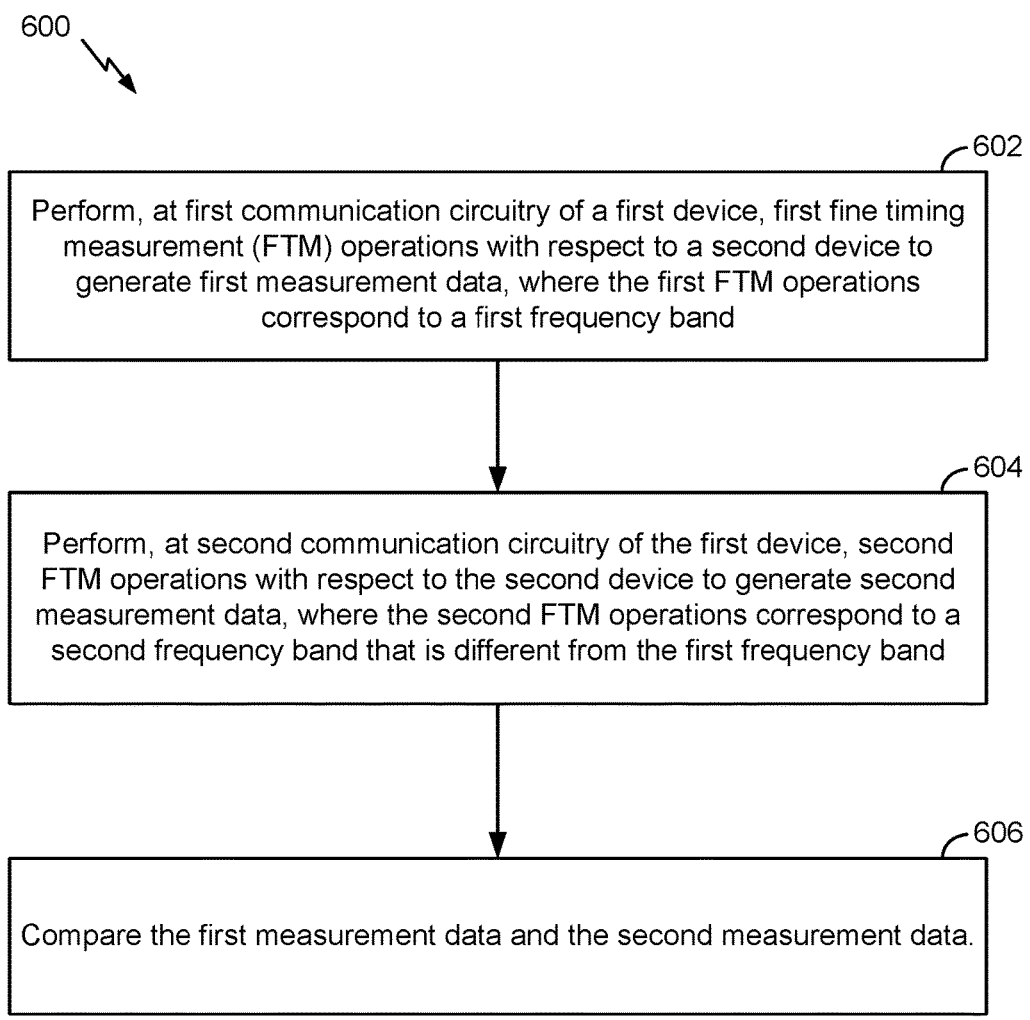
FIG. 6 is a flow chart that illustrates an illustrative method of comparing measurement data associated with different fine timing measurement (FTM) operations.

Referring to FIG. 6, a flow chart of an illustrative method of comparing measurement data associated with different FTM operations is shown and generally designated 600. In a particular implementation, the method 600 is performed by the first device 102 of FIGS. 1 and 2, the first device 302 of FIG. 3, the first device 402 of FIG. 4, or the first device 502 of FIG. 5.

The method 600 includes performing, at first communication circuitry of a first device, first FTM operations with respect to a second device to generate first measurement data, at 602. The first FTM operations correspond to a first frequency band. For example, the first communication circuitry may include or correspond to the first communication circuitry 104, the first device includes or corresponds to the first device 102, the first FTM operations may include or correspond to the first FTM operations 122, the second device may include or correspond to the second device 132, and the first measurement data may include or correspond to the first measurement data 110 of FIG. 1.

The method 600 includes performing, at second communication circuitry of the first device, second FTM operations with respect to the second device to generate second measurement data, at 604. The second FTM operations correspond to a second frequency band that is different from the first frequency band. For example, the second FTM operations may include or correspond to the second FTM operations 124 and the second measurement data may include or correspond to the second measurement data 112 of FIG. 1. In a particular implementation, at least one of the first FTM operations is performed concurrently with performance of at least one of the second FTM operations. In an alternate implementation, the first FTM operations and the second FTM operations are performed serially (e.g., the second FTM operations are performed after completion of the first FTM operations, or vice versa).

The method 600 includes comparing the first measurement data and the second measurement data, at 606. For example, the processor 106 may compare the first measurement data 110 and the second measurement data 112. In a particular implementation, a first accuracy corresponding to the first measurement data is less than a second accuracy corresponding to the second measurement data.

In a particular implementation, the first FTM operations include sending an FTM request to the second device, receiving a FTM message (including a timestamp indicating a first time) at the first device from the second device at a second time, sending an acknowledgement from the first device to the second device at a third time, and receiving, at the first device, an indicator of a fourth time (when the acknowledgement is received at the second device) from the second device. To illustrate, the first measurement data may be determined based on times T1A, T2A, T3A, and T4A, which are determined based on times of receipt or transmission of an FTM message and an acknowledgement, as further described with reference to FIG. 2. For example, the FTM request includes or corresponds to the first FTM request 202, the FTM message may include or correspond to the first FTM message 206, the acknowledgement includes or corresponds to the acknowledgement 208, and the indicator includes or corresponds to the additional message 210 of FIG. 2. The first measurement data is based on the first time, the second time, the third time, and the fourth time.

In another particular implementation, the method 600 includes determining an offset between the first measurement data and the second measurement data based on the comparison and storing tuning data (based on the offset) at a memory of the first device. For example, the offset may include or correspond to the offset 344 and the tuning data may include or correspond to the tuning data 342 of FIG. 3. The tuning data may indicate the offset, an average offset, a median offset, historical offsets, or a combination thereof. The method 600 may further include performing, at the first communication circuitry of the first device, third FTM operations (corresponding to the first frequency band) with respect to a third device to generate third measurement data and adjusting the third measurement data based on the tuning data to generate adjusted third measurement data. For example, the third FTM operations may include or correspond to the third FTM operations 354 of FIG. 3.

In another particular implementation, the method 600 includes, prior to performing the first FTM operations and the second FTM operations, receiving, at the first device from the second device, an indicator that the second device is capable of performing wireless communications associated with the first frequency band and the second frequency band. For example, the indicator may include or correspond to the indicator 462 included in the message 460 of FIG. 4. In a particular implementation, the indicator is included in a beacon message. In another particular implementation, the indicator is included in a multiband information element of a message.

In another particular implementation, the method 600 includes, prior to performing the first FTM operations and the second FTM operations, receiving a first message at the first communication circuitry of the first device from the second device. The first message indicates a first capability of the second device to communicate via the first frequency band and a first location. For example, the first message may include or correspond to the first message 566 of FIG. 5 that includes the first capability 568 and the first location 570. The method 600 further includes receiving a second message at the second communication circuitry of the first device from the second device. The second message indicates a second capability of the second device to communicate via the second frequency band and a second location. For example, the second message may include or correspond to the second message 572 of FIG. 5 that includes the second capability 574 and the second location 576. Performance of the first FTM operations and the second FTM operations are initiated based on determining that the first location matches the second location.

In another particular implementation, the method 600 includes, prior to performing the first FTM operations and the second FTM operations, receiving a message at the first device from the second device. The message includes identification data. Performance of the first FTM operations and the second FTM operations are initiated based on the identification data matching particular identification data stored at the first device. To illustrate, the message may include or correspond to the message 460, the identification data may include or correspond to the identification data 464, and the particular identification data may include or correspond to the particular identification data 458 of FIG. 4.

The method 600 may compare measurement data generated using different FTM operations to determine an offset. The offset may be used to adjust additional measurements performed using the first communication circuitry. Adjusting the additional measurements may improve the accuracy of the additional measurements.

Figure 7:
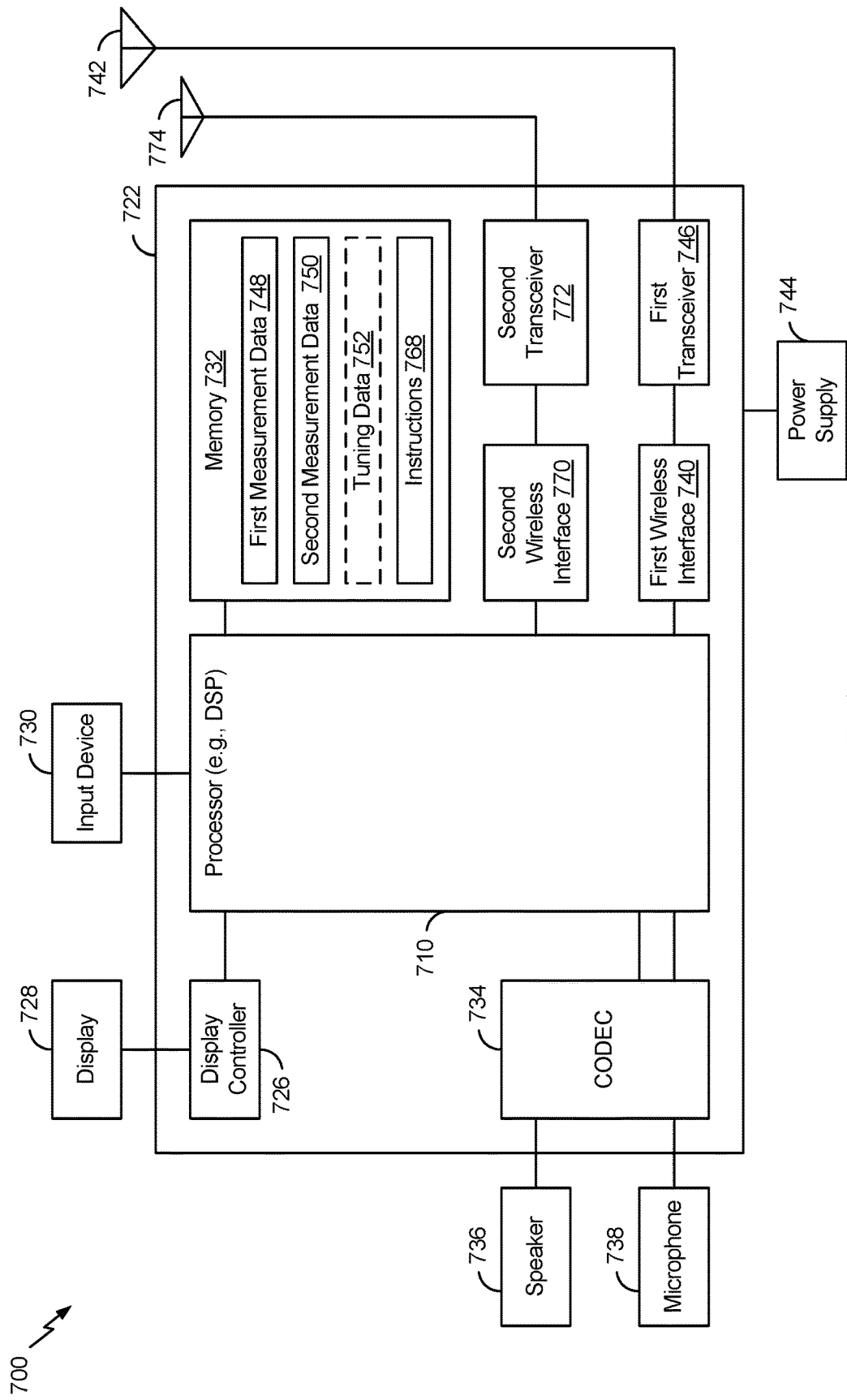
FIG. 7 is a block diagram of a wireless device that compares measurement data associated with different FTM operations.

Referring to FIG. 7, a block diagram of a particular illustrative implementation of a device (e.g., a wireless communication device) is depicted and generally designated 700. In various implementations, the device 700 may have more or fewer components than illustrated in FIG. 7.

In a particular implementation, the device 700 includes a processor 710, such as a central processing unit (CPU) or a digital signal processor (DSP), coupled to a memory 732. The memory 732 includes instructions 768 (e.g., executable instructions) such as computer-readable instructions or processor-readable instructions. The instructions 768 may include one or more instructions that are executable by a computer, such as the processor 710. The memory 732 may also store first measurement data 748 and second measurement data 750. In a particular implementation, the memory 732 also stores tuning data 752.

FIG. 7 also illustrates a display controller 726 that is coupled to the processor 710 and to a display 728. A coder/decoder (CODEC) 734 may also be coupled to the processor 710. A speaker 736 and a microphone 738 may be coupled to the CODEC 734.

FIG. 7 also illustrates that a first wireless interface 740, such as a first wireless controller, and a first transceiver 746 may be coupled to the processor 710 and to a first antenna 742, such that wireless data received via the first antenna 742, the first transceiver 746, and the first wireless interface 740 may be provided to the processor 710. FIG. 7 further illustrates that a second wireless interface 770, such as a second wireless controller, and a second transceiver 772 may be coupled to the processor 710 and to a second antenna 774, such that wireless data received via the second antenna 774, the second transceiver 772, and the second wireless interface 770 may be provided to the processor 710. Although two antennas 742 and 774 are shown, in other implementations, the wireless interfaces 740 and 770 and the transceivers 746 and 772 may share a single antenna.

In some implementations, the processor 710, the display controller 726, the memory 732, the CODEC 734, the first wireless interface 740, the first transceiver 746, the second wireless interface 770, and the second transceiver 772 are included in a system-in-package or system-on-chip device 722. In some implementations, an input device 730 and a power supply 744 are coupled to the system-on-chip device 722. Moreover, in a particular implementation, as illustrated in FIG. 7, the display 728, the input device 730, the speaker 736, the microphone 738, the first antenna 742, the second antenna 774, and the power supply 744 are external to the system-on-chip device 722. In a particular implementation, each of the display 728, the input device 730, the speaker 736, the microphone 738, the first antenna 742, the second antenna 774 and the power supply 744 may be coupled to a component of the system-on-chip device 722, such as an interface or a controller.

The device 700 may include a headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof.

In an illustrative implementation, the memory 732 includes or stores the instructions 768 (e.g., executable instructions), such as computer-readable instructions or processor-readable instructions. For example, the memory 732 may include or correspond to a non-transitory computer readable medium storing the instructions 768. The instructions 768 may include one or more instructions that are executable by a computer, such as the processor 710.

In a particular implementation, the memory 732 includes a non-transitory computer readable medium storing instructions (e.g., the instructions 768) that, when executed by the processor 710, cause the processor 710 to perform operations including initiating, at first communication circuitry (e.g., the first wireless interface 740, the first transceiver 746, the first antenna 742, or a combination thereof) of a first device (e.g., the device 700), performance of first FTM operations with respect to a second device to generate the first measurement data 748. The first FTM operations correspond to a first frequency band. The operations include initiating, at second communication circuitry (e.g., the second wireless interface 770, the second transceiver 772, the second antenna 774, or a combination thereof) of the first device, performance of second FTM operations with respect to the second device to generate the second measurement data 750. The second FTM operations correspond to a second frequency band that is different from the first frequency band. The operations further include comparing the first measurement data and the second measurement data. In a particular implementation, an offset may be determined based on the comparison, and the offset may be stored at the memory 732 as the tuning data 752.

In a particular implementation, the operations include determining, at the first device, an offset value based on the comparison of the first measurement data and the second measurement data. The operations include initiating, at the first communication circuitry of the first device, performance of third FTM operations with respect to the second device to generate third measurement data. The third FTM operations correspond to the first frequency band. The operations further include adjusting the third measurement data based on the offset value.

In conjunction with the described aspects, an apparatus includes means for performing first FTM operations with respect to a device to generate first measurement data. The first FTM operations correspond to a first frequency band. The means for performing the first FTM operations may include or correspond to the first communication circuitry 104, the first device 102, the processor 106 of FIG. 1, the first communication circuitry 304, the first device 302, the processor 306 of FIG. 3, the first communication circuitry 404, the first device 402, the processor 406 of FIG. 4, the first communication circuitry 504, the first device 502, the processor 506 of FIG. 5, one or more other structures or circuits configured to perform first FTM operations, or any combination thereof.

The apparatus includes means for performing second FTM operations with respect to the device to generate second measurement data. The second FTM operations correspond to a second frequency band that is different from the first frequency band. The means for performing the second FTM operations may include or correspond to the second communication circuitry 114, the first device 102, the processor 106 of FIG. 1, the second communication circuitry 314, the first device 302, the processor 306 of FIG. 3, the second communication circuitry 414, the first device 402, the processor 406 of FIG. 4, the second communication circuitry 514, the first device 502, the processor 506 of FIG. 5, one or more other structures or circuits configured to perform second FTM operations, or any combination thereof.

The apparatus further includes means for means for comparing the first measurement data and the second measurement data. The means for comparing may include or correspond to the processor 106 of FIG. 1, the processor 306 of FIG. 3, the processor 406 of FIG. 4, the processor 506 of FIG. 5, a comparator, one or more other structures or circuits configured to generate control signals based on logical operations performed on output signals, or any combination thereof.

In a particular implementation, the apparatus further includes means for storing tuning data. The tuning data includes one or more values determined based on the comparison of the first measurement data and the second measurement data. The means for storing may include or correspond to the memory 108 of FIG. 1, the memory 308 of FIG. 3, the memory 408 of FIG. 4, the memory 508 of FIG. 5, one or more other structures or circuits configured to store tuning data, or any combination thereof. The apparatus may further include means for adjusting additional measurement data based on the tuning data. The means for adjusting may include or correspond to the processor 106 of FIG. 1, the calibration circuitry 350 or the processor 306 of FIG. 3, the processor 406 of FIG. 4, the processor 506 of FIG. 5, one or more other structures or circuits configured to adjust additional measurement data, or any combination thereof.

In another particular implementation, the apparatus further includes means for generating channel measurement data associated with a communication channel between the means for performing the second FTM operations and the device. The means for generating may include or correspond to the processor 106 of FIG. 1, the channel measurement circuitry 352 or the processor 306 of FIG. 3, the processor 406 of FIG. 4, the processor 506 of FIG. 5, one or more other structures or circuits configured to generate channel measurement data, or any combination thereof.

One or more of the disclosed aspects may be implemented in a system or an apparatus, such as the device 700, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 700 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

While FIG. 7 illustrates a wireless communications device including at least three communication circuitries and logic gates, at least three communication circuitries and logic gates may be included in various other electronic devices. For example, at least three communication circuitries and logic gates as described with references to FIGS. 1-5, may be included in one or more components of a base station.

A base station may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

Various functions may be performed by one or more components of the base station, such as sending and receiving messages and data (e.g., audio data). The one or more components of the base station may include a processor (e.g., a CPU), a transcoder, a memory, a network connection, a media gateway, a demodulator, a transmission data processor, a receiver data processor, a transmission multiple input-multiple output (MIMO) processor, transmitters and receivers (e.g., transceivers), an array of antennas, or a combination thereof. The base station, or one or more of the components of the base station, may include at least the first communication circuitry and the second communication circuitry, as described above with reference to FIGS. 1-5.

During operation of a base station, one or more antennas of the base station may receive a data stream from a wireless device. A transceiver may receive the data stream from the one or more antennas and may provide the data stream to the demodulator. The demodulator may demodulate modulated signals of the data stream and provide demodulated data to the receiver data processor. The receiver data processor may extract audio data from the demodulated data and provide the extracted audio data to the processor. In a particular implementation, first measurement data generated based on a first FTM operation at the first communication circuitry may be compared to second measurement data generated based on a second FTM operation at the second communication circuitry.

The processor may provide the audio data to the transcoder for transcoding. The decoder of the transcoder may decode the audio data from a first format into decoded audio data and the encoder may encode the decoded audio data into a second format. In some implementations, the encoder may encode the audio data using a higher data rate (e.g., upconvert) or a lower data rate (e.g., downconvert) than received from the wireless device. In other implementations, the audio data may not be transcoded. Transcoding operations (e.g., decoding and encoding) may be performed by multiple components of the base station. For example, decoding may be performed by the receiver data processor and encoding may be performed by the transmission data processor. In other implementations, the processor may provide the audio data to the media gateway for conversion to another transmission protocol, coding scheme, or both. The media gateway may provide the converted data to another base station or core network via the network connection.

Although one or more of FIGS. 1-7 may illustrate systems, apparatuses, and/or methods according to the teachings of the disclosure, the disclosure is not limited to these illustrated systems, apparatuses, and/or methods. One or more functions or components of any of FIGS. 1-7 as illustrated or described herein may be combined with one or more other portions of another of FIGS. 1-7. For example, one or more elements of the method 600 of FIG. 6 may be performed in combination with other operations described herein. Accordingly, no single implementation described herein should be construed as limiting and implementations of the disclosure may be suitably combined without departing form the teachings of the disclosure. As an example, one or more operations described with reference to FIG. 6 may be optional, may be performed at least partially concurrently, and/or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
   first communication circuitry configured to perform first fine timing measurement (FTM) operations with respect to a device to generate first measurement data, wherein the first FTM operations correspond to a first frequency band;
   second communication circuitry configured to perform second FTM operations with respect to the device to generate second measurement data that is more accurate than the first measurement data, wherein the second FTM operations correspond to a second frequency band that is different than the first frequency band;
   a processor configured to determine an offset between the first measurement data and the second measurement data; and
   calibration circuitry configured to adjust third measurement data based on the offset, the third measurement data generated based on third FTM operations corresponding to the first frequency band.

2. The apparatus of claim 1, wherein a first accuracy corresponding to the first measurement data is less than a second accuracy corresponding to the second measurement data.

3. The apparatus of claim 1, wherein the first communication circuitry is further configured to perform at least one of the first FTM operations concurrently with performance of at least one of the second FTM operations by the second communication circuitry.

4. The apparatus of claim 1, wherein the first frequency band comprises a 2.4 gigahertz (GHz) band, a 5 GHz band, or both, and wherein the second frequency band comprises a 60 GHz band.

5. The apparatus of claim 1, wherein the first communication circuitry and the second communication circuitry include at least one shared component.

6. The apparatus of claim 1, wherein the first communication circuitry is distinct from the second communication circuitry.

7. The apparatus of claim 1, further comprising a memory configured to store tuning data, wherein the processor is further configured to store the offset as the tuning data.

8. The apparatus of claim 7, wherein the processor is further configured to initiate performance of the third FTM operations via the first communication circuitry and with respect to a second device to generate the third measurement data.

9. The apparatus of claim 1, further comprising channel measurement circuitry configured to perform one or more measurements associated with a communication channel between the second communication circuitry and the device to generate channel measurement data.

10. The apparatus of claim 9, wherein the processor is further configured to initiate the second FTM operations based on the channel measurement data satisfying a threshold.

11. The apparatus of claim 9, wherein the channel measurement data indicates a channel profile associated with the communication channel between the second communication circuitry and the device, a standard deviation of the one or more measurements, a received signal strength indicator (RSSI), a signal to noise ratio (SNR), an access delay, channel input response, path loss, or a combination thereof.

12. A method of wireless communication, the method comprising:
    performing, at first communication circuitry of a first device, first fine timing measurement (FTM) operations with respect to a second device to generate first measurement data, wherein the first FTM operations correspond to a first frequency band;
    performing, at second communication circuitry of the first device, second FTM operations with respect to the second device to generate second measurement data that is more accurate than the first measurement data, wherein the second FTM operations correspond to a second frequency band that is different from the first frequency band;
    determining an offset between the first measurement data and the second measurement data; and
    adjusting third measurement data based on the offset, the third measurement data generated based on third FTM operations corresponding to the first frequency band.

13. The method of claim 12, wherein performing the first FTM operations comprise:
    sending a FTM request to the second device;
    receiving a FTM message at the first device from the second device at a second time, wherein the FTM message includes a timestamp indicating a first time;
    sending an acknowledgement from the first device to the second device at a third time; and
    receiving, at the first device, an indicator of a fourth time from the second device, the fourth time indicating receipt of the acknowledgement at the second device, and wherein the first measurement data is based on the first time, the second time, the third time, and the fourth time.

14. The method of claim 12, further comprising:
    storing tuning data at a memory of the first device, wherein the tuning data indicates the offset, an average offset, a median offset, historical offsets, or a combination thereof.

15. The method of claim 14, further comprising:
    performing, at the first communication circuitry of the first device, the third FTM operations with respect to a third device to generate the third measurement data.

16. The method of claim 12, further comprising, prior to performing the first FTM operations and the second FTM operations, receiving, at the first device from the second device, an indicator that the second device is capable of performing wireless communications associated with the first frequency band and the second frequency band.

17. The method of claim 16, wherein the indicator is included in a beacon message.

18. The method of claim 16, wherein the indicator is included in a multiband information element of a message.

19. The method of claim 12, further comprising, prior to performing the first FTM operations and the second FTM operations:
    receiving, from the second device, a first message at the first communication circuitry of the first device, the first message indicating a first capability of the second device to communicate via the first frequency band and a first location; and
    receiving, from the second device, a second message at the second communication circuitry of the first device, the second message indicating a second capability of the second device to communicate via the second frequency band and a second location.

20. The method of claim 19, wherein performance of the first FTM operations and the second FTM operations are initiated based on determining that the first location matches the second location.

21. The method of claim 12, further comprising, prior to performing the first FTM operations and the second FTM operations, receiving a message at the first device from the second device, the message including identification data, wherein performance of the first FTM operations and the second FTM operations are initiated based on the identification data matching particular identification data stored at the first device.

22. The method of claim 21, wherein the identification data comprises a vendor identifier.

23. An apparatus comprising:
> means for performing first fine timing measurement (FTM) operations with respect to a device to generate first measurement data, the first FTM operations corresponding to a first frequency band;
> means for performing second FTM operations with respect to the device to generate second measurement data that is more accurate than the first measurement data, the second FTM operations corresponding to a second frequency band that is different from the first frequency band;
> means for determining an offset between the first measurement data and the second measurement data; and
> means for adjusting third measurement data based on the offset, the third measurement data generated based on third FTM operations corresponding to the first frequency band.

24. The apparatus of claim 23, further comprising means for storing tuning data, the tuning data including one or more values determined based on a comparison of the first measurement data and the second measurement data.

25. The apparatus of claim 23, further comprising means for generating channel measurement data associated with a communication channel between the means for performing the second FTM operations and the device.

26. A non-transitory computer readable medium storing instructions that, when executed by a processor, cause the processor to perform operations comprising:
> initiating, at first communication circuitry of a first device, performance of first fine timing measurement (FTM) operations with respect to a second device to generate first measurement data, the first FTM operations corresponding to a first frequency band;
> initiating, at second communication circuitry of the first device, performance of second FTM operations with respect to the second device to generate second measurement data that is more accurate than the first measurement data, the second FTM operations corresponding to a second frequency band that is different from the first frequency band;
> determining an offset between the first measurement data and the second measurement data; and
> adjusting third measurement data based on the offset, the third measurement data generated based on third FTM operations corresponding to the first frequency band.

27. The non-transitory computer readable medium of claim 26, wherein at least one of the first FTM operations and at least one of the second FTM operations are performed concurrently, wherein the first frequency band comprises a 2.4 gigahertz (GHz) band, a 5 GHz band, or both, and wherein the second frequency band comprises a 60 GHz band.

* * * * *